March 7, 1939.  W. A. JOHNSON  2,149,347
MOWER CUTTER BAR UNIT
Filed Aug. 30, 1937  2 Sheets-Sheet 2
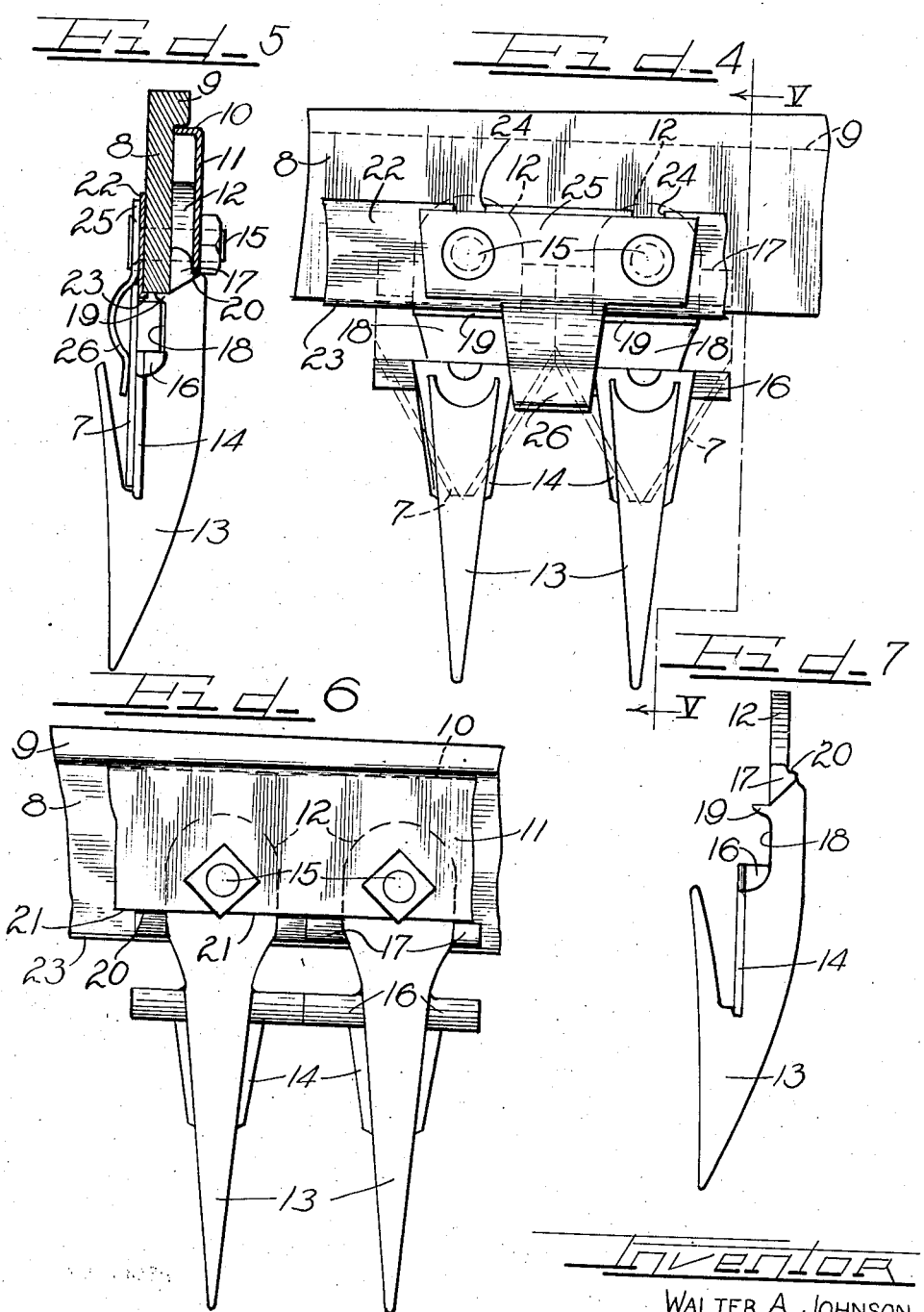
Inventor
WALTER A. JOHNSON Patented Mar. 7, 1939

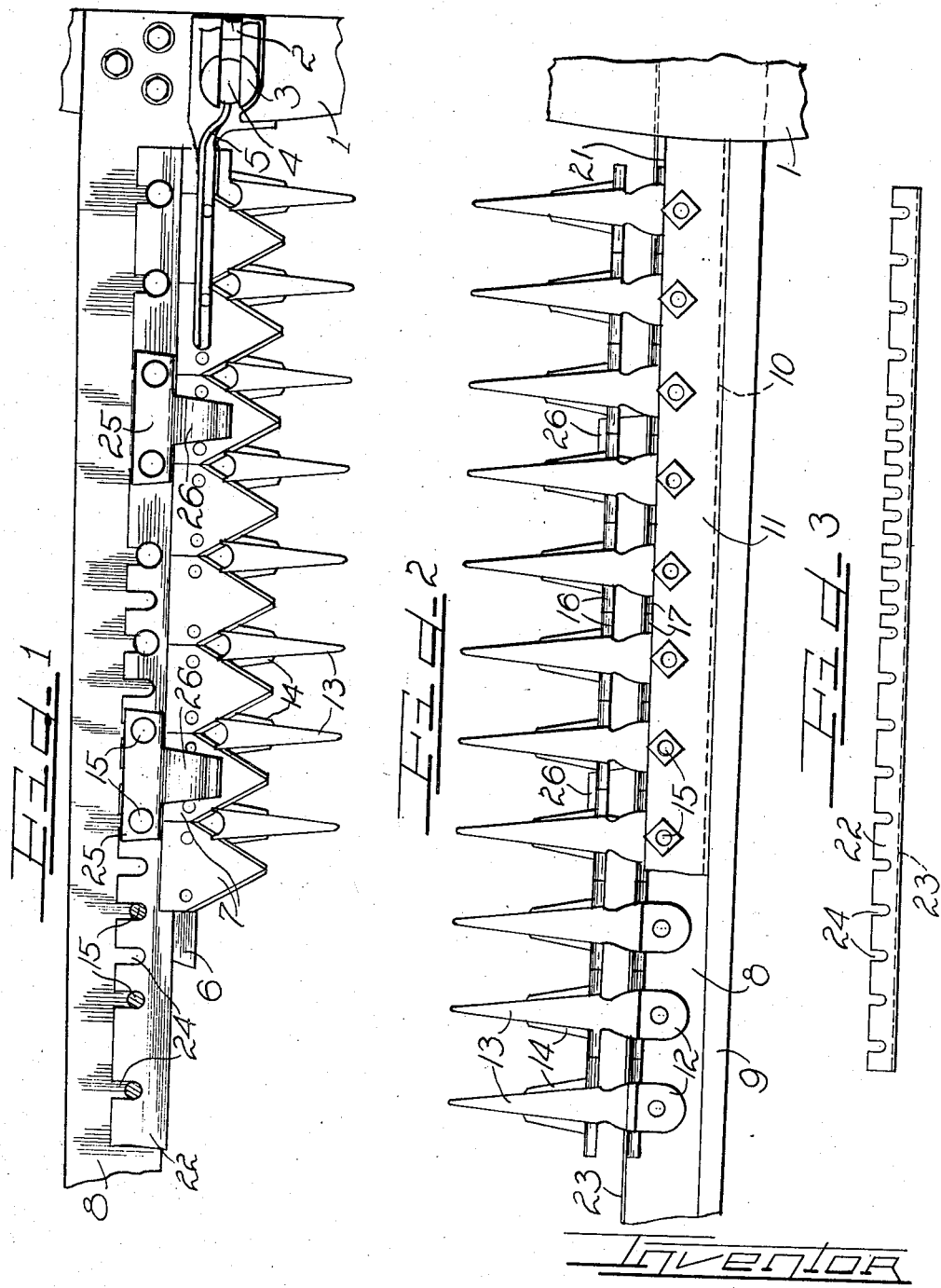

2,149,347

UNITED STATES PATENT OFFICE 2,149,347

MOWER CUTTER BAR UNIT

Walter A. Johnson, Rochester, Minn.

Application August 30, 1937, Serial No. 161,612

13 Claims. (Cl. 56—298)

In recent years, there have been very few changes or improvements made in mowers, harvesters and other farm machines provided with cutter units. With the use of the old types of mowers and harvesters, it has been found that a large percentage of the cutting trouble is caused by the separation of the reciprocating cutter blades and the flexing or bending of the main guard bar. It has also been found that with the use of a plurality of separated sickle wearing plates on the old types of mowers that they are inefficient in meeting present day cutting conditions. The inefficiency is caused by vegetable gums, partially decomposed undergrowth, dirt and the like accumulating around and wedging between the knives and cutter bar parts and lodging in and around the sickle clips. Trouble has also been encountered with the old types of mowers due to the means of anchoring the guards to the guard bar by a single bolt which is subjected to the entire torsional stresses and thrust at a leverage depending upon the approximate length of the guards.

The present invention has been designed to overcome the above mentioned defects in the old types of mowers, harvesters and the like by providing a cutter bar unit wherein the guards are provided with two sets of transverse fingers and are mounted in position on a guard bar against pivotal movement with respect to one another, said unit furthermore including a single or one-piece wearing plate disposed on one side and extending through the length of the guard bar, and provided on the opposite side of said bar with an angle cross-sectioned reinforcing plate or strip for enclosing the mounting or shank ends of the guards and coacting with the continuous wearing plate to reinforce the guard bar and securely clamp the guards in position so that the tendency of the clogging up of the operating parts of the cutter bar unit, by vegetable gums, partially decomposed undergrowth, dirt and the like, is greatly reduced, thereby providing a construction having an increased cutting efficiency.

It is an object of this invention to provide a cutter bar unit with a one-piece sickle wearing plate extending beneath the shank ends of all of the sickle cutter blades and beneath the shank ends of all of the cutter blade clips, and rigidly clamped in position by means of the guard mounting bolts to reenforce the guard bar and eliminate openings between the cutter blades and the guard bar, thereby obviating the accumulation of foreign matter beneath the shank ends of the cutter blades and preventing interference with the proper reciprocating movement of the cutter blades.

It is also an object of this invention to provide an improved type of mower cutter bar unit provided with a one-piece continuous true-bearing sickle wearing plate on one side of the guard bar and with an angle strip on the opposite side of the guard bar to form a reenforced cutter bar unit to reduce flexing thereof and providing a construction obviating the accumulation of foreign matter around operating parts of the unit.

Another object of the invention is the construction of a mower or harvesting machine cutter bar unit wherein the guards are provided with two parallel pairs of transversely projecting fingers arranged to abut the ends of the fingers of adjacent guards to more rigidly hold the guards in position against swinging or pivotal movement with respect to the guard bar and affording a construction wherein the new or additional guard fingers serve to close one side of the reenforcing angle strip on the guard bar affording a closed chamber around the mounting shank ends of the guards.

It is furthermore an object of this invention to provide an improved type of mower cutter bar unit wherein the guard bar is reenforced and clamped between a continuous one-piece sickle wearing plate and a reenforcing strip, both of which are clamped to the guard bar by the guard mounting bolts to afford a construction whereby the accumulation of foreign matter around the operating parts of the cutter bar unit is materially reduced and wherein the mounting bolts for the guards are also reenforced by the one-piece wearing plate and the reenforcing strip by reducing the torsional stresses and thrust to which the bolts on the old types of cutter bar units are usually subjected.

It is an important object of this invention to provide an improved cutter bar unit for use on agricultural machines, said cutter bar unit being constructed to increase the efficiency thereof by eliminating the accumulation of foreign matter around the operating parts of the cutter unit and by providing guards with two pairs of transversely projecting fingers instead of one pair, by providing one side of the guard bar with a reenforcing strip engaging the guard bolts and coacting with the extra pair of guard fingers to afford an enclosure for the shank ends of the guards, said efficiency of the cutter bar unit furthermore being accomplished by the use of a one-piece sickle wearing plate clamped between the guard bar and the cutter clips to afford a continuous wear plate for the moving cutter blades, thereby eliminating openings or recesses between the cutter clips and beneath the cutter blades to reduce the accumulation of foreign matter between the operating parts of the unit and obviating the separation of the reciprocating cutter blades.

Other and further important objects of this invention will be apparent from the disclosures in the specification and the accompanying drawings.

The invention (in a preferred form) is illustrated in the drawings and hereinafter more fully described.

On the drawings:

Figure 1 is a fragmentary front plan view of a mower cutter bar unit embodying the principles of this invention.

Figure 2 is a fragmentary bottom plan view of the cutter bar unit illustrated in Figure 1.

Figure 3 is a reduced top plan view of the improved one-piece sickle wearing plate forming one of the improved parts of the cutter bar unit.

Figure 4 is an enlarged fragmentary detailed top plan view of a portion of the cutter bar unit, illustrating the cutter blades in dotted lines to more clearly show the construction of the guards.

Figure 5 is a transverse sectional view taken on the line V—V of Figure 4.

Figure 6 is an enlarged fragmentary bottom plan view of a portion of the cutter bar unit, with the cutter blades omitted.

Figure 7 is a side elevational view of one of the guards.

As shown on the drawings:

The improved cutter bar unit is adapted for use on mowers, harvesters and other similar agricultural machines. The cutter bar unit is adapted to be connected to a standard mower in the regular way, and briefly comprises a guard bar support or coupling yoke 1 which is hingedly connected by means of swivel hinge pins to the swivel hinge unit forming a part of a mower or similar agricultural machine. Disposed to move transversely with respect to the coupling yoke 1 is one end of a pitman 2, on the end of which is rigidly secured a socket type of connector 3, the socket portion of which is pivotally engaged on a ball 4 which forms a rigid part of the shank portion of a knife head 5. The shank portion of the knife head 5 is rigidly secured over one end of a knife or cutter blade bar 6 which is adapted to be reciprocated by the movement of the pitman 2. Bolted or otherwise secured side by side in abutting relationship with respect to one another are a plurality of cutter blades or knives 7. The shank portions of the cutter blades or knives 7 are secured to one side of the cutter blade bar 6 with several of the endmost cuter blades 7 being disposed beneath the arm of the cutter head 5, as clearly illustrated in Figure 1.

Rigidly secured to the coupling yoke 1 is the wide end of a tapered metal guard bar 8, the outer end of which is narrower than the inner end which is secured to the coupling yoke 1. Integrally formed along the back margin of the lower side of the guard bar 8 is a tapered stop flange or bead 9, the wide end of which is positioned adjacent the coupling yoke 1. The inner surface or edge of the flange 9 is parallel with the front edge of the guard bar 8 and affords a stop against which the flange 10 of a metal reenforcing strip or plate 11 is positioned to abut. The flange 10 and the metal strip 11 form a one-piece continuous angle structure adapted to be engaged against the underside of the guard bar 8 to reenforce the same and also provide a covering or housing for engagement over the apertured shank ends 12 of a plurality of cutter guards 13. The shank portions 12 of the guards 13 are cut down or trimmed to fit beneath the reenforcing strip 11. Each of the guards 13 has rigidly secured thereon a stationary ledger blade 14 which serves as a stationary cutter for coaction with the movable cutter blades 7 carried by the cutter bar 6. The guards 13 are rigidly clamped to the guard bar 8 by means of retaining bolts 15 which also serve to hold the reenforcing angle plate 11 clamped in position against the underside of the guard bar 8.

The guards 13 are held in spaced parallel relation with respect to one another at substantially right angles with respect to the front edge of the guard bar 8, and are held against rocking or pivoting on the bolt 15 by means of the two parallel sets of fingers 16 and 17. The fingers 16 and 17 project at right angles from the opposite sides of each of the guards, and the front set of projecting fingers 16 are disposed at the wide or inner end of the ledger blade 14 and are separated from the rear or auxiliary fingers 17 by the cutter bar groove 18 and the stop rib 19 which, when the guard is mounted in position, abuts against the front edge of the guard bar, as clearly illustrated in Figure 5. The main or primary fingers 16 are positioned at a higher level than the secondary or auxiliary fingers 17, thereby permitting the rear or auxiliary fingers 17 to seat upon the margin of the underside of the guard bar 8 and against the edge of the open side of the reenforcing angle plate 11 to close the space between the edge of the plate 11 and the undersurface of the guard bar 8.

As clearly illustrated in Figure 6, the outer ends of the two sets of fingers 16 and 17 abut against the respective ends of the fingers 16 and 17 of adjacent guards, thereby providing a double brace between the guards to prevent rocking or pivoting thereof with respect to the guard bar 8. The continuous line of inner or auxiliary fingers 17 completely closes the open side of the angle plate 11, thereby providing a closure or shield for the shank ends 12 of the guards. The rear surface of each of the auxiliary or secondary fingers 17 is provided with a groove at 20 (Figure 7) to provide a seat for the open longitudinal edge 21 of the reenforcing plate or strip 11. It will thus be noted that with the double pairs of transverse fingers on each of the guards 13 and with the reenforcing plate 11 clamped over the shank ends 12 of the guards, with the edge 21 of the reenforcing plate seated in the grooves 20 of the auxiliary fingers 17 that a rigid mounting is provided for the guards, and that the torsional stresses and thrusts to which the clamping bolts 15 are subjected are partially resisted or taken up by the reenforcing plates 11.

In the improved form of cutter bar unit, the old style arrangement of providing a plurality of spaced wear plates on the top side of the guard bar has been improved in this invention by the provision of a single or one-piece sickle wearing plate which is of substantially the same length as the guard bar 8. The improved wearing plate unit consists of a long metal strip 22 having a stop flange 23 integrally formed on one longitudinal edge thereof. The longitudinal margin of the wearing strip 22 opposite the flange 23 is provided with a plurality of transverse notches 24, the majority of which are placed predetermined distances apart, while a portion of the notches 24 are arranged more closely together, thereby providing a notched marginal edge for the continuous wearing plate, affording an arrangement whereby the wearing plate is adapted for substantially universal use on cutter bar units. The continuous wearing plate is adapted to be seated upon the top surface of the front portion of the guard bar 8, with the stop flange 23 seated against the front edge of the guard bar, and with the notches 24 of the wear plate engaging around the shank portions of the retaining bolts 15, as clearly illustrated in Figure 1, to permit the retaining bolts 15 to rigidly clamp or hold the continuous wear plate locked in position, with the flanged margin of the wear plate disposed beneath the projecting shank ends of the sickle cutter blades 7.

Seated at spaced intervals upon the top surface of the continuous wear plate 22 are the apertured base plates 25 of cutter or knife clips 26 which are of spring-like construction to resiliently engage against the top surfaces of the cutter blades 7, as shown in Figures 1 and 5, to serve as guards for the reciprocating sickle unit. The base plates of the cutter clips 26 are also clamped in position on the one-piece wear plate 22 and on the guard bar by certain of the retaining bolts 15.

The improved cutter bar unit hereinbefore described includes improved forms of guards which are provided with two sets or pairs of parallel transversely projecting aligning or abutment fingers and with mounting shanks which are comparatively thin for engagement beneath the reenforcing angle strip 11. The cutter bar unit includes the improved angle strip or plate 11 which is disposed against the bottom side of the guard bar 8 and has one edge thereof positioned to coact with the groove seats 20 provided in the additional sets of guard fingers 17, thereby providing a closure housing for the mounting or shank ends of the guards. The positioning of the notched one-piece wear plate 22 on the top side of the guard bar 8 not only serves to reenforce the guard bar but provides a continuous wearing surface beneath the cutter blades 7 and eliminates any spaces wherein any foreign matter might accumulate to obstruct the proper or efficient operation of the reciprocating sickle unit.

With the adoption of the improved guard, the one-piece wear plate and the reenforcing strip, both of which are closely associated with the guard bar 8, a cutter bar construction is provided which is materially strengthened, reducing flexing or bending of the cutter bar and obviating the separation of the reciprocating cutter blades, thereby eliminating the major causes of trouble in the old types of mower cutter bar units. The slotted holes in the one-piece wear plate permit the wear plate to be readily removed or replaced, without removing the bolts, as is the case with all other types of wear plates.

It will, of course, be understood that numerous details of construction may be varied through a wide range without departing from the principles of this invention, and it is, therefore, not the purpose to limit the patent granted hereon otherwise than is necessitated by the scope of the appended claims.

I claim as my invention:

1. An agricultural machine cutter bar unit comprising a supporting yoke, a guard bar connected thereto, a plurality of guards secured to the guard bar, a reenforcing housing secured to the guard bar and enclosing the mounted ends of said guards, a sickle unit coacting with said guards, a notched one-piece sickle wearing plate of substantially the length of the guard bar and supported thereon engaged by the sickle unit, and clips on the wearing plate and secured to the guard bar, said clips projecting into engagement with the sickle unit.

2. An agricultural machine cutter bar unit comprising a supporting yoke, a guard bar thereon, a plurality of guards, means securing the guards to the guard bar, a sickle unit coacting with the guards, and a reenforcing housing secured to the guard bar by said guard securing means and covering the mounted ends of the guards.

3. The combination with a mower cutter bar unit, of a flanged and notched continuous sickle wearing plate secured thereto and providing a continuous uninterrupted bearing for the moving parts of the cutter bar unit, said plate being removable from the cutter bar without requiring removal of any of the other parts of the mower cutter bar unit.

4. In an agricultural machine cutter bar unit, a sickle wearing device comprising a continuous one-piece metal strip of substantially the same length as the cutter bar unit and having a plurality of spaced notches in one longitudinal margin thereof.

5. In an agricultural machine cutter bar unit, a sickle wearing device comprising a continuous one-piece metal strip of substantially the same length as the cutter bar unit and having a plurality of spaced notches in one longitudinal margin thereof, with said notches spaced and grouped to make said sickle wearing device adaptable for use on various types of cutter bar units, and a stop flange intergrally formed on the longitudinal margin of said metal strip opposite the notches therein.

6. In an agricultural machine, a sickle wear device comprising a long continuous one-piece metal strip having a plurality of spaced notches formed in one longitudinal margin thereof and provided with an integral flange along the opposite longitudinal margain of said metal strip and extending throughout the entire length thereof.

7. In a mower cutter bar unit, a sickle wear device comprising a continuous one-piece metal strip extending through substantially the entire length of the cutter bar unit and having a plurality of spaced notches provided in one longitudinal margin thereof opposite a continuous flange formed on the opposite longitudinal margin of the metal strip.

8. A mower cutter bar unit comprising a guard bar, means connected therewith for mounting the same on a mower, a sickle unit movably associated with the guard bar, and a flanged and notched continuous one-piece sickle wearing plate secured to the guard bar and extending throughout the length thereof to provide a continuous wearing surface for engagement by the movable sickle unit.

9. A mower cutter bar unit comprising a guard bar, means for supporting the same on a mower, a flanged and notched continuous one-piece sickle wearing plate secured on one side of the guard bar and extending throughout substantially the entire length thereof, a plurality of guards secured against the opposite side of the guard bar, spaced parallel pairs of transversely projecting fingers formed on each of said guards with the fingers of one guard in abutting engagement with the fingers of adjacent guards to brace the guards in position against transverse movement, a movable sickle unit coacting with said guards and in slidable engagement with the continuous sickle wearing plate, sickle clips mounted on the guard bar and coacting with the movable sickle unit, and a flanged reenforcing cover plate secured to the guard bar and enclosing the mounted ends of the guards and in engagement with one pair of the transversely projecting fingers of each of said guards.

10. A mower cutter bar unit including in combination a guard bar, a one-piece notched angle sickle wear plate seated on the upper face of the guard bar and extending throughout substantially the entire length thereof, and a one-piece apertured angle reinforcing plate engaged against the opposite side of the guard bar to reenforce the same.

11. A mower cutter bar unit including in combination a guard bar, a plurality of guards secured thereto, retaining bolts mounting the guards on the guard bar, and flanged continuous one-piece angle plates reversed and inverted with respect to one another and engaged against opposite sides of the guard bar and held clamped in position thereon by means of the guard retaining bolts.

12. A mower cutter bar unit comprising a guard bar, a plurality of adjacently positioned guards mounted to contact the bottom surface of the guard bar, a reenforcing plate enclosing the mounted ends of the guards and contacting the bottom surface of the guard bar, a continuous one-piece notched sickle wear plate seated against the top surface of the guard bar and extending throughout the length thereof, sickle clips seated at spaced intervals on the continuous one-piece wear plate, and a plurality of retaining members for rigidly clamping the guards, the reenforcing plate, the continuous sickle wear plate, and the sickle clips to the guard bar.

13. A mower cutter bar unit including in combination a guard bar having a rib integrally formed on the underside thereof along the rear margin of the guard bar, a plurality of guards positioned adjacent one another, main fingers projecting transversely from the sides of the guards into abutting contact with the fingers on the adjacent guards, bolts for holding the shank ends of the guards to the front marginal portion of the guard bar, a plate of substantially the length of the guard bar covering the shank ends of the guards, and abutting against the rib formed on the guard bar, said guard bar and plate being held separated from one another by the shank portions of the guards leaving openings between the adjacent guards, and auxiliary fingers projecting from the sides of the rear portions of the guards into abutting contact with the auxiliary fingers on adjacent guards, said auxiliary fingers resting upon the front margin of the bottom surface of said guard bar and closing the openings between the guards formed by the guard bar and said plate, said auxiliary guard fingers having grooved seats formed therein to receive the front edge of said plate seated therein.

WALTER A. JOHNSON.